Dec. 8, 1970     L. R. BAKER     3,546,466
RADIANT SENSITIVE APPARATUS FOR MEASURING LINEAR DIMENSIONS
Filed Aug. 16, 1968     3 Sheets-Sheet 1
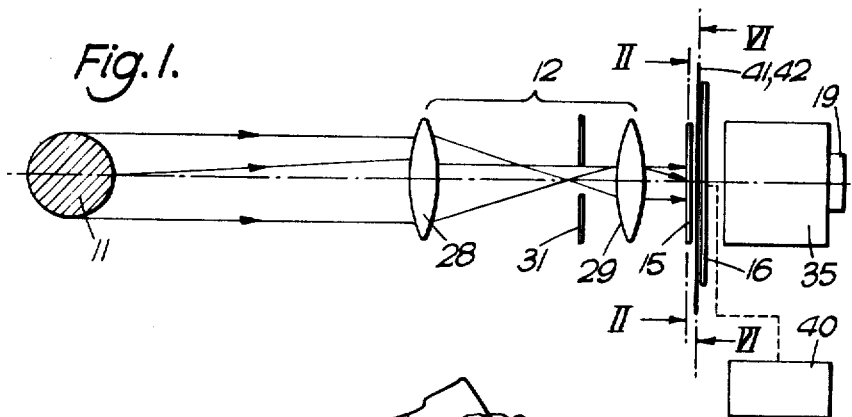
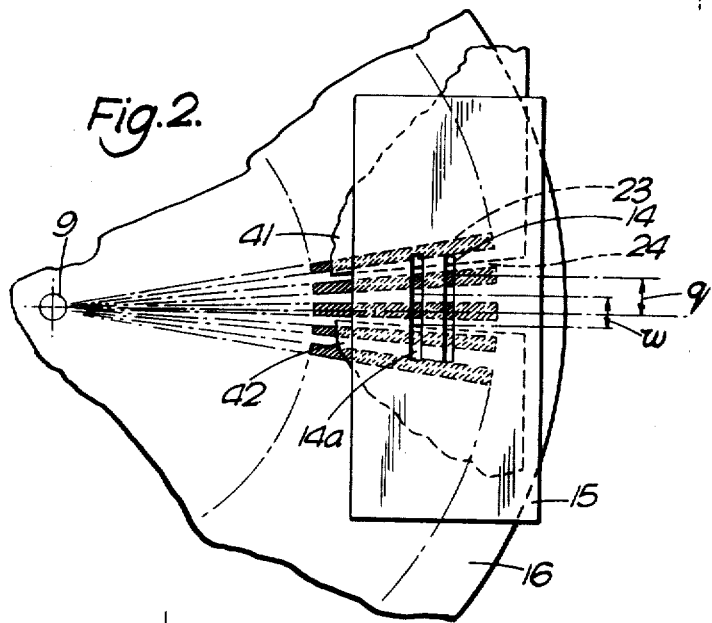
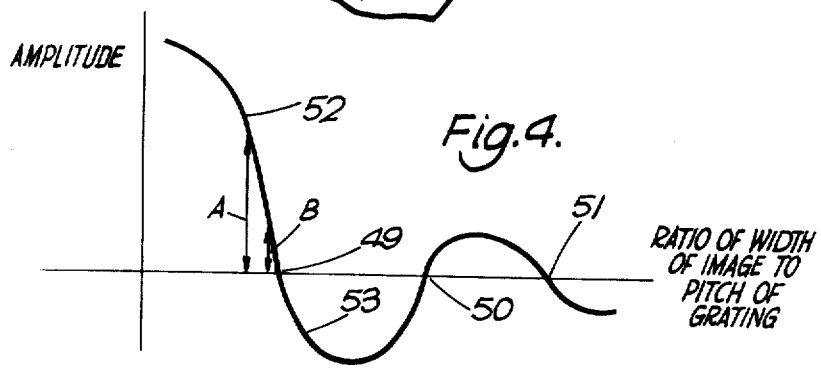
INVENTOR
LIONEL RICHARD BAKER
BY Cushman, Darby & Cushman
ATTORNEYS INVENTOR
LIONEL RICHARD BAKER
BY Cushman, Darby & Cushman
ATTORNEYS Dec. 8, 1970  L. R. BAKER  3,546,466
RADIANT SENSITIVE APPARATUS FOR MEASURING LINEAR DIMENSIONS
Filed Aug. 16, 1968  3 Sheets-Sheet 3
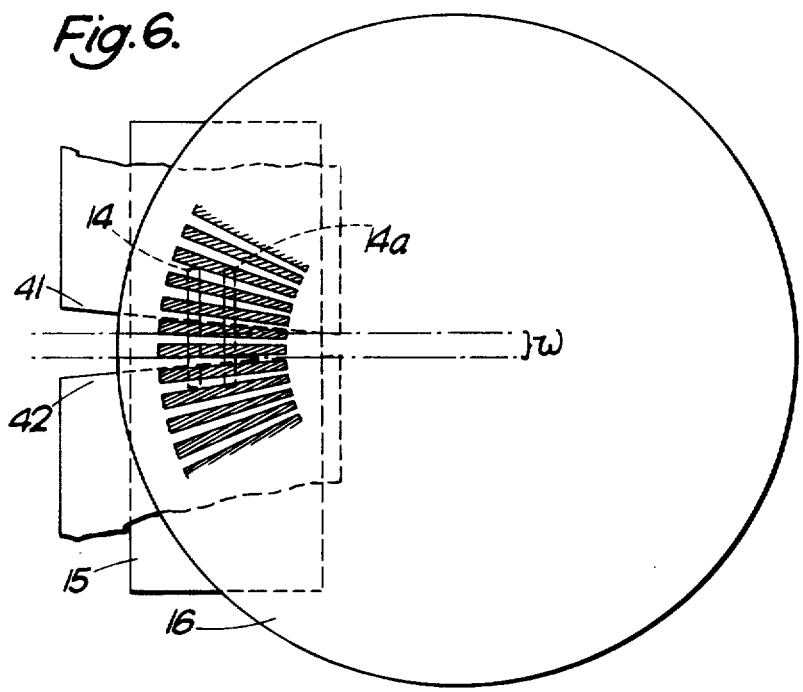
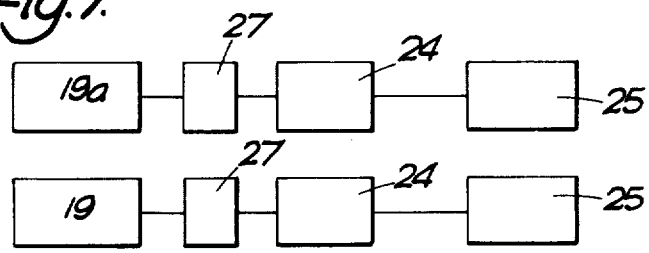
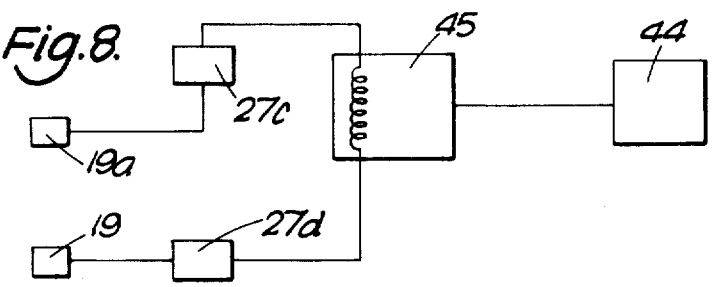
INVENTOR
LIONEL RICHARD BAKER
BY Cushman, Darby & Cushman
ATTORNEYS

United States Patent Office 3,546,466
Patented Dec. 8, 1970

3,546,466
RADIANT SENSITIVE APPARATUS FOR MEASURING LINEAR DIMENSIONS
Lionel Richard Baker, Chislehurst, Kent, England, assignor to British Scientific Instrument Research Association, Sira, South Hill, Chislehurst, Kent, England, a British company
Continuation-in-part of application Ser. No. 524,339, Feb. 1, 1966. This application Aug. 16, 1968, Ser. No. 753,146
Claims priority, application Great Britain, Aug. 21, 1967, 38,481/67
Int. Cl. G01d 5/36; H01j 39/12; H03k 3/42
U.S. Cl. 250—209
12 Claims

ABSTRACT OF THE DISCLOSURE

Apparatus for measuring a linear dimension of an object which emits, transmits, absorbs, or reflects radiation. A lens system forms an image of the object on a slit. A radial grating scans the image, the regions of the grating scanning the image in a direction in which the linear dimension is to be measured. A photocell senses the radiation from the grating and provides an A.C. signal representing the response of the regions of the grating to the image, the degree of modulation of the electrical signal being a measure of the linear dimension. A measuring means, which is responsive to limited frequencies of the A.C. signal, measure the degree of modulation and thereby the linear dimension. The limited frequencies may be determined by the frequency of a further A.C. signal derived by the scanning by the grating of a second image of the object. The measuring means may include an induction motor one set of windings of which are fed from the said A.C. signal and another set of windings of which are fed from the further signal.

RELATED APPLICATION

The present application is a continuation-in-part of copending U.S. application Ser. No. 524,339, filed Feb. 1, 1966, now Pat. No. 3,450,889.

BRIEF SUMMARY OF THE INVENTION

The invention provides in one of its aspects apparatus for measuring a linear dimension of an object which emits, transmits, absorbs or reflects radiation, which apparatus includes imaging means for forming an image of the object, means for scanning the image and responsive to the image for producing a modulated A.C. electrical signal, the degree of modulation of which provides a measure of the said linear dimension, and means responsive to limited frequencies of said A.C. signal for measuring the degree of modulation and thereby the said linear dimension.

The invention provides in another of its aspects apparatus for measuring a linear dimension of an object which emits, transmits, absorbs, or reflects radiation, which apparatus includes imaging means for forming an image of the object, scanning means for scanning the image by movement relative to the image in a direction in which the linear dimension is to be measured, which scanning means is sub-divided in the said direction into a number of regions having differing degrees of response to the radiation incident upon them from the said image, electrical signal generating means arranged to provide an A.C. electrical signal representing the response of the regions of the scanning means to the image, and means responsive to limited frequencies of said A.C. signal for measuring the degree of modulation of the said electrical signal and thereby provide a measure of the linear dimension of the object being measured.

BRIEF DESCRIPTION OF THE VIEWS OF THE DRAWINGS

FIG. 1 diagrammatically shows an apparatus for measuring a linear dimension of an object;
FIG. 2 is a section on a line II—II of FIG. 1;
FIG. 4 is a wave form illustrating the theory of the invention;
FIG. 6 is a section on the line VI—VI of FIG. 1;
FIG. 7 is a block diagram of another electrical circuit for the apparatus;
and
FIG. 8 is a block diagram of a further electrical circuit for the apparatus.

DETAILED DESCRIPTION

Figure 3:
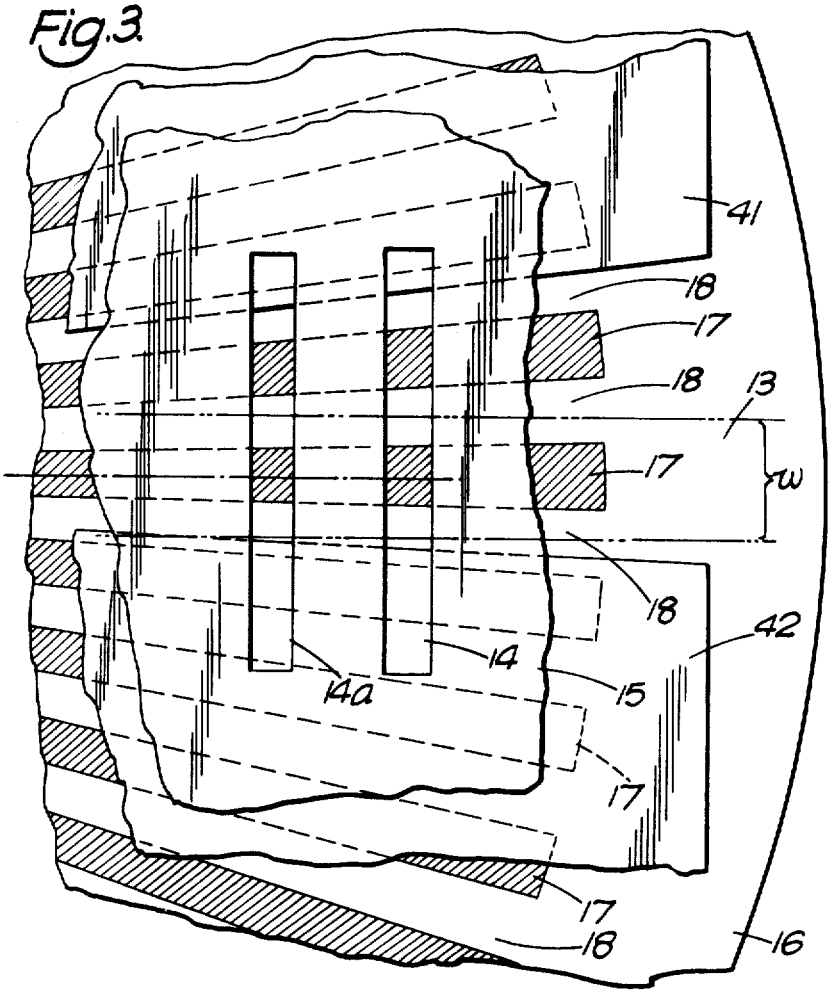
FIG. 3 is an enlargement of part of FIG. 2.

Referring to FIG. 1 the apparatus is for measuring the diameter of a hot rod 11 which emits radiation. An imaging system 12 focuses an image 13 of width $w$ on to slits 14 and 14$a$ in a plate 15, as shown in FIGS. 2 and 3. Each slit 14 and 14$a$ is elongated and extends along the direction in which the rod 11 is to be measured (that is at right angles to the longitudinal axis of the rod 11). Immediately adjacent the plate 15 is a radial grating 16. Each slit 14 and 14$a$ isolates a short length of the image of the rod 11 which subsequently falls on the grating 16. The width of each image formed on the grating 16 depends upon the magnification of the imaging system 12, which has two converging lenses 28 and 29 and a telecentric stop 31. The magnification of the imaging system 12 will be the ratio of the focal lengths of the lenses 29 and 28 respectively. The telecentric stop 31 insures that the rod 11 is viewed using only parallel light so that the width of each image on the grating 16 will not vary if the distance of the rod 11 from the apparatus (i.e. from the lens 28) is altered. The grating 16 consists of a circular plate rotatably mounted about an axis 32 perpendicular to the plane of the grating 16 and passing through its centre 9. The grating 16 has a series of opaque regions 17 alternating with transparent regions 18 around its periphery (only some of the regions are shown). Each of the regions 17 and 18 is the same in size and shape. The distance across each region decreases towards the centre of the grating 16 and each region subtends an equal angle at the centre of the grating. A motor 40 (shown schematically in FIG. 1) is provided to rotate the grating 16 so that the regions 17 and 18 move continuously and at a constant speed past the slits 14 and 14$a$ to scan the slits. The radiation transmitted through the transparent regions 18 of the grating from the slits 14 and 14$a$ is collected in radiation integrating enclosures 35 and 36 respectively (enclosure 36 is hidden by enclosure 35 in FIG. 1) and is received by photoelectric cells 19 and 19$a$ respectively. Each of the enclosures 35 and 36 is lined with a highly polished but dimpled surface or with crinkled metal foil for scattering the radiation.

The electrical signal from each cell 19 and 19$a$ will have an A.C. component with a frequency equal to that at which the transparent regions 18 pass the slits 14 and 14$a$. As the slits 14 and 14$a$ are side-by-side these A.C. components will necessarily be in phase and will remain in phase even if the rod vibrates. The amplitude or degree of modulation of each A.C. signal will vary according to the function $$\frac{\sin \pi x}{\pi x}$$

where $x$ is ratio of the width of the image to the distance across two adjacent regions of the grating 16 as shown in FIG. 4. When these distances are equal the A.C. component will be reduced to zero because despite the movement of the regions of the grating 16 across the image precisely half of the image will transmit radiation to the associated photoelectric cell 19 or 19a. This state of affairs is indicated at 49 in FIG. 4. Similarly if this ratio were equal to an integral multiple (e.g. 2 or 3) the amplitude of the A.C. signal would again be zero as indicated at 50 and 51 in FIG. 4. There is a phase change of $\pi$ at 49, $2\pi$ at 50 and $3\pi$ at 51. The dimensions of the apparatus are arranged so that it operates on the substantially linear part of the curve shown between 52 and 53 in FIG. 4. The amplitude of the A.C. signals associated with the two slits 14 and 14a are indicated respectively by A and B. The width of the image in each case is less than the distance across two adjacent regions of the grating.

Both of the A.C. signals will contain noise components which merely arise from stray radiation or from the electrical components. As shown in FIG. 7 either of the two A.C. signals may be amplified by an amplifier 27 and passed through suitable narrow band filters 24 which eliminate from the signal all but a limited range of frequencies centered about the frequencies at which the regions 17 and 18 of the grating 16 pass each slit. This filtering eliminates a certain amount of noise from the signal and thereby improves the signal to noise ratio of the apparatus. The filtered signal is passed to suitable electrical meters 25 which measure the degree of modulation and thereby the linear dimension of the rod 11.

Figure 5:
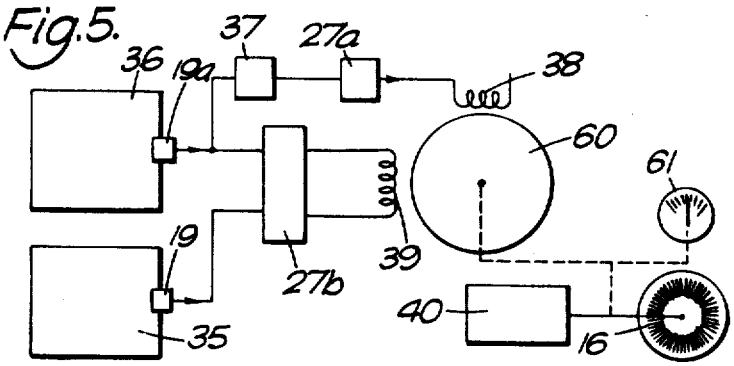
FIG. 5 is a block diagram of an electrical circuit for the apparatus.

Alternatively as shown in FIG. 5 the signal from the photocell 19a after amplification by an amplifier 27a is fed to one set of windings 38 of a servo induction motor 60. Also a further signal which is the difference of the two signals from the photoelectric cells 19 and 19a is fed after amplification by an amplifier 27b to the set of windings 39 of the servo motor 60. The phase of the signal to one of the sets of windings is changed by 90° by a phase change device 37. As the motor 60 is an induction motor it responds only to the components of the two signals in its winding which are 90° out of phase and in this way the motor responds only to the limited frequencies of the two A.C. signals from the cells 19 and 19a which are in phase i.e. it responds to frequencies of the signals around the frequencies at which the regions of the grating 16 pass the slits 14 and 14a. Thus the signal to noise ratio is improved. A good signal to noise ratio is particularly important when the level of radiation from the rod or other object being measured is not greatly different from that of its surroundings. The rotor of the motor 60 is connected (as shown schematically in FIG. 5) so that when it rotates it moves the plate 15 so that the slits 14 and 14a move towards or away from the centre of the grating 16. As the slits 14 and 14a move the amplitudes A and B (or degrees of modulation) of the signals from the photoelectric cells 19 and 19a will change but their difference will remain substantially constant as the apparatus is being operated on the straight portion of the curve shown in FIG. 4. The motor 60 is arranged to move the grating 16 in such a direction that the amplitude of the current in the windings 38 is reduced so that the position of the grating 16 is adjusted until the width of the image formed across the slit 14a is equal to the distance across two adjacent regions on the grating 16 i.e. until the degree of modulation of the A.C. signal from the photocell 19a has been reduced to a predetermined value of zero or substantially zero. When this condition is reached there will be no current in the winding 38 and the motor 60 will stop. This particular distance across two adjacent regions of the grating 16 will be a predetermined fraction of the diameter of the rod 11 depending on the magnification of the imaging system 12. The rotor is also arranged to move an indicator 61 to indicate the measurement of the diameter of the rod 11.

The apparatus may conveniently be used in a steel mill for measuring and/or controlling the dimension of steel being rolled. In this case the grating 16 may be preset to a particular position relative to the plate 15, the motor 60 being used to operate controls for controlling the spacing of the steel mill rolls until the thickness of the steel is such that the width of the image reaches a predetermined value.

It will be appreciated that the induction motor 60 may be replaced by any other electrical measuring means which may be controlled to be responsive to limited frequencies of an A.C. signal under the control of a further A.C. signal. For instance as shown in FIG. 8 a motor 44 fed by a D.C. signal could be used, the D.C. signal being provided by using a phase sensitive rectifier 45 to rectify the signal from the photocell 19a under the control of a further signal which is the difference of the two signals from the two photocells 19 and 19a. As before the signals from the photocells 19 and 19a are amplified in amplifiers 27c and 27d.

As the motor 60 (or other electrical measuring means) is required to respond to a limited range of frequencies the amplifiers 27 for amplifying the signals from the photocells 19 and 19a require only narrow bandwidths.

Each of the slits 14 and 14a will transmit a certain amount of residual scattered radiation not coming from the hot rod 11. This radiation can be considered as that arising from an image having a width equal to the total length of each slit 14 or 14a. In order that the amplitude of the signal arising from this radiation is zero or substantially zero the length of each of the slits 14 and 14a is arranged to be an integral multiple of the distance across two adjacent regions of the grating 16 e.g. the amplitude of this signal will be that shown at a point such as 50 or 51 in FIG. 4. Preferably the length of the slit 14a is somewhat shorter than that of the slit 14. As the regions on the grating 16 taper towards the centre of the grating the ends of each slit 14 and 14a are inclined so that each has a shape of a trapezium. This is readily accomplished by the use of two stops 41 and 42 as shown in FIG. 6, the stops having their edges directed towards the centre of the grating 16 and fixed to the carriage supporting the grating. In this way the length of the slits 14 and 14a are adjusted to be two or more times the distance across adjacent pairs regions 17, 18 of the grating.

The invention is not limited to the details of the foregoing embodiments. For instance the servo motor 60 could move the plate 15 rather than the grating 16 in which case the enclosures 35 and 36 have to be made to move with the plate 15. Also the grating or other scanning means 16 instead of having alternate opaque and transparent regions could have a sinusoidal varying transmission. Furthermore the imaging system 12 could comprise a single lens instead of the two lenses 28, 29 and the stop 31.

I claim:

1. Apparatus for measuring a linear dimension of an object which emits, transmits, absorbs, or reflects radiation, which apparatus includes imaging means for forming an image of the object, scanning means for scanning the image by movement relative to the image in a direction in which the linear dimension is to be measured, which scanning means is subdivided in the said direction into a number of regions having differing degrees of response to the radiation incident upon them from the said image, electrical signal generating means arranged to provide an A.C. electrical signal representing the response of the regions of the scanning means to the image, and means responsive to limited frequencies of said A.C. signal determined by the frequency of a further A.C. signal for measuring the degree of modulation of the said electrical signal and thereby provide a measure of the linear dimension of the object being measured, said measuring means including an induction motor one set of windings at which are fed from the further signal.

2. Apparatus for measuring a linear dimension of an object which emits, transmits, absorbs, or reflects radiation, which apparatus includes imaging means for forming an image of the object, scanning means for scanning the image by movement relative to the image in a direction in which the linear dimension is to be measured, which scanning means is subdivided in the said direction into a number of regions having differing degrees of response to the radiation incident upon them from the said image, electrical signal generating means arranged to provide an A.C. electrical signal representing the response of the regions of the scanning means to the image, and means responsive to limited frequencies of said A.C. signal determined by the frequency of a further A.C. signal for measuring the degree of modulation of the said electrical signal and thereby provide a measure of the linear dimension of the object being measured, said measuring means including a motor fed from the said A.C. signal via a phase sensitive rectifier controlled by the said further signal.

3. Apparatus for measuring a linear dimension of an object which emits, transmits, absorbs, or reflects radiation, which apparatus includes imaging means for forming an image of the object, scanning means for scanning the image by movement relative to the image in a direction in which the linear dimension is to be measured, which scanning means is subdivided in the said direction into a number of regions having differing degrees of response to the radiation incident upon them from the said image, electrical signal generating means arranged to provide an A.C. electrical signal representing the response of the regions of the scanning means to the image, and means responsive to limited frequencies of said A.C. signal for measuring the degree of modulation of the said electrical signal and thereby provide a measure of the linear dimension of the object being measured, said measuring means including servo control means for adjusting at least one of the image forming means and the scanning means to alter the degree of modulation of said A.C. signal until it reaches a predetermined value, the linear dimension being then known from the adjustment.

4. Apparatus for measuring a linear dimension of an object which emits, transmits, absorbs, or reflects radiation, which apparatus includes imaging means for forming an image of the object, scanning means for scanning the image by movement relative to the image in a direction in which the linear dimension is to be measured, which scanning means is subdivided in the said direction into a number of regions having differing degrees of response to the radiation incident upon them from the said image and includes a radial grating the width of each of the regions of which varies with the radial distance from the center of the grating, the grating being arranged for rotation about its axis to effect scanning, electrical signal generating means arranged to provide an A.C. electrical signal representing the response of the regions of the scanning means to the image, and means responsive to limited frequencies of said A.C. signal for measuring the degree of modulation of the said electrical signal and thereby provide a measure of the linear dimension of the object being measured.

5. Apparatus for measuring a linear dimension of an object which emits, transmits, absorbs, or reflects radiation, which apparatus includes imaging means for forming a first image of the object and another image, scanning means for scanning both the first and another image by movement relative to the image in a direction in which the linear dimension is to be measured, which scanning means is subdivided in the said direction into a number of regions having differing degrees of response to the radiation incident upon them from the said image said scanning means including a radial grating the width of each of the regions of which varies with the radial distance from the center of the grating, the grating being arranged for rotation about its axis to effect scanning of the images, electrical signal generating means arranged to provide an A.C. electrical signal representing the response of the regions of the scanning means to the image and another A.C. electrical signal representing the response of the regions of the scanning means to the said another image, and means responsive to limited frequencies of said A.C. signal determined by the frequency of a further A.C. signal derived by the scanning of said another image and from said another A.C. signal for measuring the degree of modulation of the said electrical signal and thereby provide a measure of the linear dimension of the object being measured said measuring means including servo control means arranged to adjust the radial position of at least the said image of the two images on the grating to alter the degree of modulation of the said A.C. signal until it reaches a predetermined value, the linear dimension being then known from the adjustment.

6. Apparatus as claimed in claim 5, in which the servo control comprises an induction motor one set of windings of which are fed from the A.C. signal and another set of windings of which are fed from a further signal derived from the difference of the two A.C. signals, the motor being arranged to carry out the adjustment until the degree of modulation has reached zero.

7. Apparatus as claimed in claim 6, in which the adjustment is effected by movement of the grating relative to the image forming means.

8. Apparatus for measuring a linear dimension of an object which emits, transmits, absorbs, or reflects radiation, which apparatus includes imaging means for forming an image of the object including a telecentric stop so that the distance of the apparatus from the object may be varied without affecting the measurement, scanning means for scanning the image by movement relative to the image in a direction in which the linear dimension is to be measured, including a plate having first and second regions which transmit, and do not transmit, respectively, the radiation incident upon them, the said first and second regions being all of equal width in the direction of scanning, and including a radiation transmitting slit on which an image of the object is formed, said slit extending in the direction in which the linear dimension is to be measured and the scanning means is moved relative to the slit with the first and second regions passing alternately along the length of the slit, the extent of the slit being substantially equal to an integral multiple of the width across a first region and an adjacent second region, electrical signal generating means arranged to provide an A.C. electrical signal representing the response of the regions of the scanning means to the image, and means responsive to limit frequencies of said A.C. signal for measuring the degree of modulation of the said electrical signal and thereby provide a measure of the linear dimension of the object being measured, said measuring means including a servo control for adjusting the scanning means to alter the degree of modulation of the said A.C. signal until it reaches zero.

9. Apparatus for measuring a linear dimension of an object which emits, transmits, absorbs, or reflects radiation, which apparatus includes imaging means for forming an image of the object, scanning means for scanning the image by movement relative to the image in a direction in which the linear dimension is to be measured, which scanning means is subdivided in the said direction into a number of regions having differing degrees of response to the radiation incident upon them from the said image, electrical signal generating means arranged to provide an A.C. electrical signal representing the response of the regions of the scanning means to the image, including a light integrating enclosure lined with a highly polished but dimpled surface for collecting radiation from the image and means responsive to limited frequencies of said A.C. signal for measuring the degree of modulation of the said electrical signal and thereby provide a measure of the linear dimension of the object being measured.

10. Apparatus for measuring a linear dimension of an object which emits, transmits, absorbs, or reflects radiation, which apparatus includes imaging means for forming an image of the object, scanning means for scanning the image by movement relative to the image in a direction in which the linear dimension is to be measured, which scanning means is subdivided in the said direction into a number of regions having differing degrees of response to the radiation incident upon them from the said image, electrical signal generating means arranged to provide an A.C. electrical signal representing the response of the regions of the scanning means to the image including a light integrating enclosure lined with crinkled metal foil for scattering the radiation in the enclosure, and means responsive to limited frequencies of said A.C. signal for measuring the degree of modulation of the said electrical signal and thereby provide a measure of the linear dimension of the object being measured.

11. Apparatus for measuring a linear dimension of an object which emits, transmits, absorbs, or reflects radiation, which apparatus includes imaging means for forming images of the object, scanning means for scanning the images by movement relative to the images in a direction in which the linear dimension is to be measured, said scanning means having regions of differing response to the radiation from the object so that the scanning means scans the images to produce a modulated beam of radiation, electrical signal generating means responsive to the modulated radiation to produce a modulated A.C. electrical signal from the modulated beam and measuring means responsive to limited frequencies of said A.C. electrical signal received from the images, including adjusting means for adjusting the relative positions of the scanner and the image to adjust the frequency of the regions scanning the image, to thereby measure the degree of modulation of the said electrical signal and provide a measure of the linear dimension of the object being measured.

12. Apparatus as claimed in claim 11, wherein the adjusting means adjusts the relative position of the scanner and the image until the width of the image is equal to the distance across two adjacent regions on the grating so that the degree of modulation is zero.

References Cited

UNITED STATES PATENTS

| | | | |
|---|---|---|---|
| 3,174,045 | 3/1965 | Whitney et al. | 250—209 |
| 3,291,991 | 12/1966 | Welti | 250—233X |
| 3,450,889 | 6/1969 | Baker | 250—233X |

JOHN KOMINSKI, Primary Examiner

C. R. CAMPBELL, Assistant Examiner

U.S. Cl. X.R.

250—208, 219, 233, 236